US008385927B2

(12) United States Patent
Pfeiffer

(10) Patent No.: US 8,385,927 B2
(45) Date of Patent: Feb. 26, 2013

(54) GENERATION OF A SPACE-RELATED TRAFFIC DATABASE IN A RADIO NETWORK

(75) Inventor: Bernd Pfeiffer, Bergisch Gladbach (DE)

(73) Assignee: T-Mobile International AG & Co. KG, Bonn (DE)

( * ) Notice: Subject to any disclaimer, the term of this patent is extended or adjusted under 35 U.S.C. 154(b) by 852 days.

(21) Appl. No.: 11/914,363

(22) PCT Filed: May 8, 2006

(86) PCT No.: PCT/DE2006/000792
§ 371 (c)(1),
(2), (4) Date: Jul. 30, 2009

(87) PCT Pub. No.: WO2006/119743
PCT Pub. Date: Nov. 16, 2006

(65) Prior Publication Data
US 2010/0029286 A1    Feb. 4, 2010

(30) Foreign Application Priority Data
May 13, 2005   (DE) .......................... 10 2005 022 925

(51) Int. Cl.
*H04W 40/00*   (2009.01)
*H04W 72/00*   (2009.01)
*H04W 74/00*   (2009.01)
*H04W 24/00*   (2009.01)
*H04W 4/00*    (2009.01)
*G06F 15/16*   (2006.01)

(52) U.S. Cl. ........ 455/449; 455/453; 455/452; 455/450; 455/446; 455/423; 370/329; 709/249

(58) Field of Classification Search ........... 455/446–454
See application file for complete search history.

(56) References Cited

U.S. PATENT DOCUMENTS
6,223,041 B1 * 4/2001 Egner et al. ................ 455/452.2
6,366,780 B1 * 4/2002 Obhan ........................ 455/453
(Continued)

FOREIGN PATENT DOCUMENTS
EP     1294208 A1    3/2003
WO    03084267 A1   10/2003

OTHER PUBLICATIONS

Beck, R. et al., "Grand—A Program System for Radio Network Planning", PTR Philips Telecommunication Review, 49:18-22 (1991).

*Primary Examiner* — Kent Chang
*Assistant Examiner* — Nathan Brittingham
(74) *Attorney, Agent, or Firm* — Browdy and Neimark, P.L.L.C.

(57) ABSTRACT

The present invention relates to a method for generating a space-related traffic database for a radio network which comprises a plurality of radio cells which can each be assigned to a group of radio cells, with a region to be mapped being subdivided into area elements by a grid and each of the area elements being allocated a respective assignment probability for each of the radio cells which supply the area element and a land-use class from amongst a finite group of land-use classes by generation being achieved by a minimization process in which the distance between the measured traffic of a radio cell and the predicted traffic of the radio cell is minimized for each radio cell, with the traffic, which is to be predicted, of a respective radio cell being set equal to the sum of area elements which are weighted by land use class-specific and group-specific coefficients, which area elements of the respective radio cell for a respective land-use class and for a respective group of radio cells are produced from the assignment probabilities of the area elements to the radio cells included in the process, and the coefficients are determined by the minimization process and assigned to the corresponding radio cell. The present invention also relates to a computer program and a corresponding computer-program product.

18 Claims, 4 Drawing Sheets

U.S. PATENT DOCUMENTS

| | | | |
|---|---|---|---|
| 6,400,946 B1 * | 6/2002 | Vazvan et al. | 455/432.1 |
| 7,142,868 B1 * | 11/2006 | Broyles et al. | 455/453 |
| 7,203,489 B2 * | 4/2007 | Saunders | 455/423 |
| 2003/0186693 A1 * | 10/2003 | Shafran et al. | 455/423 |
| 2003/0188029 A1 * | 10/2003 | Shafran et al. | 709/249 |

* cited by examiner

GENERATION OF A SPACE-RELATED TRAFFIC DATABASE IN A RADIO NETWORK

TECHNICAL FIELD

The present invention relates to a method for generating a space-related traffic database for a radio network. The invention particularly relates to a method for generating a traffic database for a multi-layer radio network. The present invention additionally relates to a corresponding computer program and a computer program product.

BACKGROUND OF THE INVENTION

A method of this type may be used for planning and predicting traffic that is generated in a coverage area of a cellular radio network, particularly a digital radio network such as, for example, a radio network, which is based on the GSM or UMTS standard. The basis for the generation of a useable traffic database is an assignment of customers who are moving in the area, such as e.g., mobile radio units, to a radio network radio cell serving them, or to a base station located in this radio cell, in a manner that is matched to the real conditions as closely as possible. A simplified method for this, which is based on the application of a field strength prediction model for each radio cell, is known from the presentation "Radio Network Planning with EDGE" by Dr. Bernd Pfeiffer, which was given at the IBC Conference "EDGE", June 2001 Dublin. The radio cell is defined in this method by a coverage area in which the base station that is located therein acts as a so-called "best server". According to this best-server model, an allocation or assignment of a certain area element within a radio network to a radio cell or to a base station located therein is uniquely defined. As long as a customer is located within the thus uniquely defined coverage area of a certain radio cell, he is served by the so-called best server. Outside this coverage area, he is automatically served uniquely defined by an adjoining or other radio cell, the base station of which then acts as the best server. This means that, under the best-server model, there is no overlap or correlation with respect to the service for a customer who is located in the radio network. The radio cells are uniquely separated from each other and at the same time immediately adjacent, so that the assignment of a customer, such as a mobile radio unit, moving within the same to a radio cell is always uniquely defined.

In contrast to the above, it is known from the presentation "Achieving the Optimal Mix of relevant and reliable input data for interference analysis and automatic frequency planning" by Dr. Bernd Pfeiffer, given at the IIR Conference "The frequency planning technical forum", May 1998, London, in deviation from the simplified, above-mentioned best-server model, to allow for correlations with respect to the coverage of an area element on the part of adjoining radio cells within a radio network by using so-called assignment probabilities of the area element, or of a customer located within the area element, such as, e.g., a mobile radio unit, to the individual radio cells. This is done by assigning a certain probability to each area element within the radio network, with which a subscriber located in this area element, such as, e.g., a mobile radio unit, is served or covered by a certain radio cell. As long as the mobile radio unit is located at an area element within this radio network, the sum of the assignment probabilities over all radio cells belonging to the radio network is smaller than or equal to one. If the sum of the assignment probabilities at an area element is smaller than one, this means that the respective area element is no longer fully covered by the radio network. This situation exists at the edge of the network and in coverage gaps of the radio network. If the sum of the assignment probabilities at an area element within the radio network is equal to one, it is certain that the subscriber is receiving service at the respective area element from at least one radio cell. However, compared to the above-described best-server model, it is not uniquely defined by which radio cell the subscriber is served; instead, a prediction can be made here only with the above-mentioned assignment probability.

While the so-called best-server radio cell model, which assigns exactly one radio cell to each area element, can be described as discrete, the use of a so-called continuous radio cell model has the effect that each area element of the radio network can be assigned a radio cell only with a certain probability.

Particularly when examining so-called multi-layer radio networks, the best-server model is overly simplified for a generation of a space-related traffic database, since a uniquely defined allocation or assignment of a radio cell to an area element does not appear very realistic in this case because of the multiple layers, which are generated, for example, by overlays of multiple radio networks.

It was accordingly an object of the present invention, proceeding from the best-server model, to make available a method whereby it is possible to generate a space-related traffic database also in the case of a multi-layer radio network, with the aid of which a prediction of traffic being generated at the area elements in the radio network is made possible.

SUMMARY OF THE INVENTION

This object is met according to the invention with a method having the characteristics of claim 1. Advantageous improvements of the invention are listed in the subclaims.

According to claim 1 of the present invention, a method is provided for generating a space-related traffic database for a radio network, wherein the radio network comprises multiple radio cells, which can each be assigned to a group of radio cells. In the process, a region to be planned is subdivided into area elements by a grid, and each area element is allocated an assignment probability to each of the radio cells serving the area element and also a land usage class from amongst a finite group of land usage classes. According to the inventive method, the generation of the space-related traffic database is achieved by a minimization process in which a distance between a measured traffic within the radio cell and traffic to be predicted within the radio cell is minimized for each radio cell. The traffic to be predicted for a given radio cell, in the process, is set equal to a sum of area elements that are weighted with land-usage-class-specific and group-specific coefficients; the area elements of the respective radio cell are obtained for a given land usage class and for a given group of radio cells from the assignment probabilities of the area elements to the radio cells included in the process, and the coefficients are determined through the minimization process and assigned to the respective radio cell.

The inventive method proceeds from the above-mentioned best-server method, and is expanded or generalized compared to the same to apply to radio networks that cannot be described using the discrete radio cell model on which the best-server method is based.

The inventive method also applies to the best-server model, which may be regarded as a special case of discrete radio cell model.

In one embodiment of the inventive method the land usage classes are defined by various classes of urban development, various classes of agricultural use and forests, as well as by roads and interstates.

It is also conceivable to use as the radio network a multi-layer radio network consisting of multiple overlaid radio networks (layers). The different layers of the radio network may be, for example, a GSM radio network in the 900 MHz frequency band (GSM900) and a GSM radio network in the 1800 MHz frequency band (GSM1800). It is also conceivable to use a GSM macrocell radio network and a microcell radio network of the same or of different frequency bands, or a combination of a GSM and UMTS radio network, or a layering of two UMTS networks with different frequencies.

Even if a mono-layer radio network consisting of a 2G or 3G radio network with single coverage of the coverage area is used, it is possible to generate the traffic database on the basis of only this one layer with the aid of a mono-layer radio cell model, which permits the calculation of the mono-layer assignment probabilities.

It is possible, as described in the above-mentioned presentation, to use as the method for computing the assignment probabilities of an area element to the respective radio cells a field strength level of the radio cells that is calculated at the area element with the use of a field strength prediction model, and handover algorithms that are used in the respective radio network, and handover parameters that are set at the base stations serving the area element and used to control the handover algorithms in the radio network. The assignment probabilities then enter into the inventive method as given parameters.

For GSM radio networks the sum over all assignment probabilities of an area element can be smaller than or equal to one. In the case of UMTS radio networks the sum of all assignment probabilities at an area element can also be greater than one because of the influence of a so-called soft-handover that occurs in these radio networks.

In the text that follows, the special case of the best-server model will be described first.

The radio network, in this case, comprises n adjoining radio cells. In each radio cell an individual traffic can be measured, which can be described in a radio cell i by a measured quantity $m_i$. The measured traffic may be voice traffic; it is also conceivable, however, to use data traffic as the measured quantity, to generate a traffic database for data traffic. The traffic in each radio cell of the radio network can accordingly be described by a vector m that looks as follows:

$$m = \begin{pmatrix} m_1 \\ m_2 \\ ... \\ m_n \end{pmatrix}$$

where n is the number of radio cells in the radio network. Additionally, land usage classes are defined, which describe the usage habits for an area. Each area element can belong to exactly one land usage class. Belonging to each land usage class is a land usage class coefficient. These land usage class coefficients are denoted with the Greek letters $\alpha$, $\beta$, $\gamma$, etc. Furthermore, belonging to the land usage class coefficient $\alpha$ is a vector a whose coefficients $a_i$ describe the portion of an area of a radio cell i that belongs to the land usage class a. For a land usage class a, the vector a with n components is thus obtained as follows:

$$a = \begin{pmatrix} a_1 \\ a_2 \\ ... \\ a_n \end{pmatrix}$$

Each component $a_i$ of the vector a is calculated as follows:

$$a_i = \int_{landusage = aCell\,i\,is\,Best\,Server} dx \text{ with the unit } [km^2]$$

This is now carried out for all radio cells 1 through n and for each given land usage class. The land usage classes, as previously mentioned, also include so-called "road classes", which means that different usage behavior within roads as compared to less densely populated areas can be taken into account. If one now weights the vectors that result for each land usage class with corresponding land usage class coefficients and adds them together, the above-introduced vector m is obtained, whose components $m_i$ correspond to the measured traffic in a respective cell i. The coefficients for each of the land usage classes are unknown and can be determined by solving the following equation:

$$\alpha \begin{pmatrix} a_1 \\ a_2 \\ ... \\ a_n \end{pmatrix} + \beta \begin{pmatrix} b_1 \\ b_2 \\ ... \\ b_n \end{pmatrix} + ... = \begin{pmatrix} m_1 \\ m_2 \\ ... \\ m_n \end{pmatrix}$$

The coefficients or weighting factors, which are denoted in the above equation with Greek letters, are the unknown variables of the system. If, for example, the measured data m is given in a certain unit, such as Erlang for voice traffic, or kbit/sec for data traffic, it is clear that the weighting factors must have the unit Erlang/km$^2$ or kbit/sec per km$^2$, respectively. If, for example, 16 land usage classes are defined and a radio network with 1000 base stations is examined, the equation system has 1000 lines and 16 unknown variables. This overdefined linear equation system is usually not exactly solvable, but is solved instead in the form of an approximation.

The above-mentioned equation can also be described in the form of a conventional linear imaging problem. The following matrix C can then be introduced for the components of the vectors that are assigned to the individual land usage classes:

$$C = \begin{pmatrix} a_1 & b_1 & ... & r_1 \\ a_2 & b_2 & ... & r_2 \\ ... & ... & ... & ... \\ a_n & b_n & ... & r_n \end{pmatrix}$$

and the weighting coefficients in vectorial form are as follows:

$$\gamma = \begin{pmatrix} \alpha \\ \beta \\ ... \\ \rho \end{pmatrix}$$

The equation system accordingly takes the following short form:

$$C \cdot y = m$$

It is advantageous to further subdivide the n base stations of the radio network into a finite number of groups, such as, for example, $n_g$ groups. This means that each radio cell i can be assigned to a certain group g(i) of the $n_g$ groups. g(i) denotes the group number of a radio cell i. A group can be defined, for example, through indication of a certain interval of the measured traffic per cell area. This means that all cells in one group have a similar traffic density. By introducing the groups, the above-mentioned equation systems can be subdivided into smaller sub-systems corresponding to the number $n_g$ of groups of radio cells and each of these sub-systems has the same structure. The land usage class coefficients $y_k$ that are to be determined in each group k can then be determined through the following condition:

$$\min_{y_k} \frac{1}{2} \|C_k y_k - m\|_2^2,$$

where $y_k \geq 0$ must apply.

This may be performed for each group independently from the other groups, since no mutual effect or interaction takes place between two radio cells that belong to different groups. This means that each group can have a different set of land usage class coefficients $y_k$. This means that the weightings of the land usage classes in each group of radio cells may turn out to be different.

In a coverage area of a radio cell i, the traffic according to the so-called best-server model is distributed for each land usage class with the corresponding coefficient of the group g(i) over the entire coverage area. If, for example the land usage class at one area element is a and the radio cell i is the so-called best server, the following expression results for the local traffic tw(x) (tw=traffic weight):

$$tw(x) = \alpha_{g(i)}$$

The coefficients $\alpha_{g(i)}$ that are calculated for each group g(i) can accordingly be saved or stored in a traffic database for all radio cells i of the group g(i) and can be used to determine the local traffic at an area element.

Additionally, the coefficients that are stored in the thusly generated traffic database may be used to determine or predict the traffic within a radio cell i. This predicable traffic t(i) is calculated as follows:

$$t(i) = \int_{Cell\ i\ is\ Best\ Server} tw(x) \cdot dx$$

This means that, in the case of 16 land usage classes, for example, t(i) is obtained from the following equation:

$$t(i) = \sum_{j=1}^{16} C_{g(i)}^{ij} \cdot y_{g(i)}^{j}$$

At the same time the above-mentioned traffic should correspond to the traffic measured in the radio cell i, which means that t(i) should preferably be identical to $m_i$.

The minimization condition of the above-mentioned equation is therefore equivalent to the condition that the sum of the differences between the originally measured traffic value $m_i$ and the predicted traffic t(i) that was derived from the generated traffic database, is minimized over all radio cells:

$$\sum_{i=1}^{n} (t(i) - m_i)^2 = \min$$

In the text that follows, an exemplary embodiment of the inventive method for generating a space-related traffic database in a radio network will be described.

In a continuous radio cell model, as previously mentioned, however, the assignment of an area element to a radio cell is generally not uniquely defined with respect to the coverage of the area element, i.e., it can be determined only with a certain assignment probability. This means that each area element of a region to be planned can be assigned to a specific radio cell with a radio-cell-specific assignment probability. This assignment probability at an area element x to a radio cell i will be referred to in the following text as ap(i,x) (ap=assignment probability). This is in contrast to the described discrete best-server model, according to which each area element can be assigned exactly one radio cell.

In a model that has been expanded in this manner, a radio cell i can be assigned a coverage area "Area (i)", which is obtained as the sum of all area elements that are each weighted with a specific assignment probability. The coverage area of a radio cell i can accordingly be described as follows:

$$Area(i) = \int ap(i,x) \cdot dx$$

Accordingly, the calculation for the traffic t(i) to be predicted of a specific radio cell i must be modified as follows:

$$t(i) = \int ap(i,x) \cdot tw(x) \cdot dx$$

In the process, the local traffic weights tw(x) that are derivable from a traffic database to be generated are weighted with the corresponding assignment probabilities ap(i,x). The integral over the entire area thus provides a statement regarding the traffic that may be expected at a certain radio cell i. In the process, the local traffic weights tw(x) must be determined such that it is again guaranteed that the respective differences between the originally measured traffic data $m_i$ of the radio cells i and the predicted traffic t(i) of the radio cells i that is to be derived from the traffic database to be generated, is as small as possible.

This method will be explained below with the aid of a first, simple example. An area element at the location x will be examined that falls into the land usage class a. The assumption will be made that three radio cells i, j, k at this area element have an assignment probability at the location x that is not equal to zero. Furthermore, the assumption will be made that these three radio cells belong to different radio cell groups g(i), g(j), and g(k), of $n_g$ groups of radio cells. In order to now obtain a consistent algorithm, whereby a generation of a traffic database can be performed, on one hand, and which permits a realistic traffic prediction in the radio cells on the other hand, all three radio cells i, j, k in this simplified example must contribute to the local traffic weight tw(x) with their respective assignment probabilities, which are combined in each case with the corresponding group-specific land usage class coefficients α. This means that tw(x) is obtained as the sum over the land usage class coefficients weighted with the respective assignment probabilities of the corresponding group to which the individual radio cells belong. This can be formulated as follows:

$$tw(x) = ap(i,x) \cdot \alpha_{g(i)} + ap(j,x) \cdot \alpha_{g(j)} + ap(k,x) \cdot \alpha_{g(k)}$$

This means that the local traffic weight tw(x) is obtained from the generated traffic database in such a way that the land usage class coefficients α that are assigned to the land usage classes are stored in the generated traffic database, as previously also described based on the best-server model. The local traffic weight tw(x) accordingly corresponds to the sum of the individual land usage class coefficients, which, in turn, are weighted with corresponding assignment probabilities of the corresponding radio cells.

From this, the predictable traffic t(i) of a specific radio cell i is obtained as the integral or sum over the local traffic weights tw(x) over the entire area, with the individual area elements again being weighted with their respective assignment probability ap(i,x) to the radio cell i. Accordingly, the following expression is obtained for the argument of the integral:

$$ap(i,x) \cdot tw(x) = ap(i,x) \cdot \{ap(i,x) \cdot \alpha_{g(i)} + ap(j,x) \cdot \alpha_{g(j)} + ap(k,x) \cdot \alpha_{g(k)}\}$$

From this simplified case of three radio cells i, j and k, which belong to different groups g(i), g(j), and g(k) of radio cells, it now becomes apparent that the different radio cells or groups or radio cells at an area element of the radio network correlate or interact, which is expressed in a corresponding product of the assignment probabilities in the above expression.

At the same time, in order to achieve a consistent statement, the coefficients of the individual land usage classes must also fulfill an analog linear equation problem in the model that has been expanded from the best-server model, which can again be written in an expression C·y=m. m again corresponds to a vector whose coefficient corresponds to the measured traffic m; at a respective radio cell i.

As compared to the simplified model of the best-server model, however, the matrix C now has an expanded dimension compared to the matrix C of the best server model. Due to the fact that a correlation now exists between the individual radio cells, the individual matrix elements $a_{ij}$, which represent a measure for the overlap of one cell i with all cells that belong to the group j within the land usage class a, is obtained as follows:

$$a_{ij} = \int_{Land\ usage=a} ap(i,x) \cdot \left( \sum_{k, g(k)=j} ap(k,x) \right) \cdot dx$$

Since the radio cells at an area element can now belong with an assignment probability that is not equal to zero to radio cells of different groups that have different land usage class coefficients, the equation system can no longer be subdivided into simple independent groups of smaller subsystems. The matrix C accordingly now contains area information for all groups of radio cells, based on which the matrix C can be expressed as follows:

$$C = \begin{pmatrix} a_{1l} & \cdots & a_{1n_g} & b_{1l} & \cdots & b_{1n_g} & \cdots & r_{1l} & \cdots & r_{1n_g} \\ a_{2l} & \cdots & a_{2n_g} & b_{2l} & \cdots & b_{2n_g} & \cdots & r_{2l} & \cdots & r_{2n_g} \\ \cdots & & \cdots & \cdots & & \cdots & & \cdots & & \cdots \\ a_{nl} & \cdots & a_{nn_g} & b_{nl} & \cdots & b_{nn_g} & \cdots & r_{nl} & \cdots & r_{nn_g} \end{pmatrix},$$

where the vector y, which, again contains the coefficients for the individual land usage classes, can accordingly be formulated as follows:

$$y = \begin{pmatrix} \alpha_1 \\ \alpha_2 \\ \cdots \\ \alpha_{n_g} \\ \beta_1 \\ \cdots \\ \beta_{n_g} \\ \cdots \\ \rho_{n_g} \end{pmatrix}$$

This formulation of the land usage information matrix is in conformity with the modified method of traffic prediction. The solution algorithm again minimizes the difference between the originally measured traffic and the predicted traffic data. In this context it is important to note that the matrix C also includes entries that are zero. A matrix element $a_{ij}$ describes the size of overlap of a radio cell i with all radio cells within the land usage class a that have a group number j. If, for example, all radio cells surrounding the radio cell i have the same group number g(i), all matrix elements $a_{ij}$ with $j \neq g(i)$ within the matrix C are zero.

If one now uses the best-server model mentioned at the beginning, it is apparent that only the matrix elements $a_{ig(i)}$ will not be equal to zero. The equation system is therefore analogous to the one described in connection with the best-server method and an independent solution for each group is possible.

With the now presented expression of the matrix C, it is possible to determine, with a set of traffic values $m_i$ measured at the individual radio cells i of the radio network, to determine a coefficient $\alpha_{g(i)}$ for each land usage class a and for each group $g_{(i)}$ of radio cells, which can be entered into the traffic database to be generated. The coefficients that have been determined in this manner can later be used to determine the traffic to be predicted for a specific radio cell i of the radio network, namely through the equation $$t(i) = \sum_l \sum_k^{n_g} C_k^{il} y_k^l,$$

where l corresponds to a respective land usage class and k corresponds to a group of radio cells.

One advantage of the inventive method lies in that a radio network can be described much more realistically. The radio network is imaged better with respect to a traffic prediction since it is not based on a precisely determinable assignment of an area element to a specific radio cell, but each area element is instead allocated an assignment probability to a radio cell of the radio network. The fact that different assignment probabilities flow into the determination of a traffic prediction for a certain radio cell permits a more realistic image.

Additionally, the inventive method provides for a fast numeric calculation or coefficient calculation due to the linear equation form. With the use of a computer, the entire radio network can thus be calculated very quickly with respect to its traffic database. This means that a traffic database can be generated quickly, on one hand, and a generated traffic database can be modified quickly on the other hand.

Additionally it is possible to keep a so-called traffic prediction error, i.e., the above-mentioned deviation between predicted and measured traffic of a radio cell, low with the inventive method, as the assignment probabilities find application both for the generation of the traffic database, as well as for the prediction of the generated traffic, and a mutually balancing effect can thus be effected for the prediction error.

In the text that follows, a number of possible applications of the inventive method will be described.

The use of assignment probabilities is useful for a great variety of traffic databases. The application of the inventive method is generally possible for mono-layer radio networks, which operate only in a 2G or 3G network layer, or in radio cell models that operate between different network layers.

In the text that follows, a 2G radio network with base stations of a 2G layer will be examined. As already described in the presentation mentioned at the beginning, the advantage of a radio network model with assignment probabilities lies in that a more realistic calculation of an area of a radio cell is made possible. For example, in a 2G mono-layer radio cell model, which is based on handover, a radio cell coverage area is described taking into account immediate or direct handover parameters, such as a hysteresis for a handover ("HO_MARGIN"), through corresponding assignment probabilities. As a result, a radio cell coverage area can be determined in dependence upon these handover parameters and it is thus more realistic in comparison with a radio cell coverage area that is based on the best-server model.

Since the number $n_g$ of groups of radio cells is small in comparison with the number of radio cells, especially in large networks, it can be expected that over large areas all overlapping radio cells will belong to one and the same group. To be able to better illustrate a consequence resulting from this, the above example of the three radio cells i, j, k, will be used at the area element x. The assumption will be made that the three radio cells belong to the same group g(i). This simplifies the integrand of the integral of the traffic t(i) to be predicted at the radio cell (i) as follows:

$$ap(i,x) \cdot tw(x) = ap(i,x) \cdot \{ap(i,x) \cdot \alpha_{g(i)} + ap(j,x) \cdot \alpha_{g(j)} + ap(k,x) \cdot \alpha_{g(k)}\} = ap(i,x) \cdot \{ap(i,x) + ap(j,x) + ap(k,x)\} \alpha_{g(i)}$$

Additionally it holds true, under the assumption that only three radio cells i, j, k exist, that the assignment probabilities for the area element x add up to 1 in the sum over the three mentioned radio cells. This follows from the standardizing property, namely that the area element x, as long as it is located within the coverage area of the radio network, must be covered by at least one of the radio cells i, j, k. This condition can be expressed as follows:

$$ap(i,x) + ap(j,x) + ap(k,x) = 1$$

From this, the integrand of traffic t(i) that is to be predicted is obtained as:

$$ap(i,x) \cdot tw(x) = ap(i,x) \cdot \alpha_{g(i)}$$

From this, it becomes apparent that, as a rule, a handover-based radio cell model as it is described here can likewise be simplified and the traffic database generated for it is similar to the traffic database for the above-mentioned best-server model. This means that, as a rule, many coefficients of the matrix C of the linear equation system are in reality zero and the overall system therefore becomes simplified. One advantage of using assignment probabilities, as compared to the best-server model, may be seen in that the mean error in the traffic prediction is smaller, most definitely, however, a "smoother" traffic map is obtained, since the transition of the land usage class coefficients at the boundary between the radio cells that belong to different groups is determined with the use of the assignment probabilities.

Looking at a 3G radio network with base stations or radio cells of a 3G layer, the advantage of a radio cell model with assignment probabilities is again obtained in the form of an improved calculation of a radio cell coverage area. Additionally it is possible in a radio cell model that uses a so-called "soft" handover algorithm, like it is implemented for example in a UMTS network, to describe a 3G soft handover with corresponding methods. In this case it can be taken into account in the radio cell model that a mobile radio unit located in the soft handover areas of the UMTS radio network will, with a certain probability, also assign itself to more than one base station or to a so-called "Node B". This means that, at an area element in this soft-handover area, the sum of all assignment probabilities to all serving Nodes B can also become greater than one.

If the traffic measurements or measured data are determined at a node B, it is possible, depending on the method of measurement, that the traffic in so-called soft-handover areas may be determined twice or multiple times, since an air interface connection exists simultaneously for two or more nodes B for mobile radio units that are located in the soft-handover areas. If such traffic measurement data are used for generating a traffic database, such a phenomenon must also be taken into account in the applied radio cell model, for reasons of consistency.

This may be described with a radio cell model having a so-called variable standardization. This means that it is permitted in an area with soft handover that the sum of all assignment probabilities in an area element is greater than one. It can be expected that the possible simplification, as it was described in the case of a 2G mono-layer, will also apply to larger areas of a UMTS network. This improved 3G soft-handover radio cell model can also be used for generating a traffic database and for predicting traffic in a consistent manner.

Additional advantages and embodiments of the invention will become apparent from the description and from the appended drawing.

It will be appreciated that the above-mentioned characteristics and those that will be explained below, can be used not only in the presented respective combination but also in other combinations or taken by themselves without departing from the framework of the present invention.

BRIEF DESCRIPTION OF THE INVENTION

The invention is depicted schematically in the drawing based on an exemplary embodiment and will be described in detail below with reference to the drawing.

DETAILED DESCRIPTION

Figure 1:
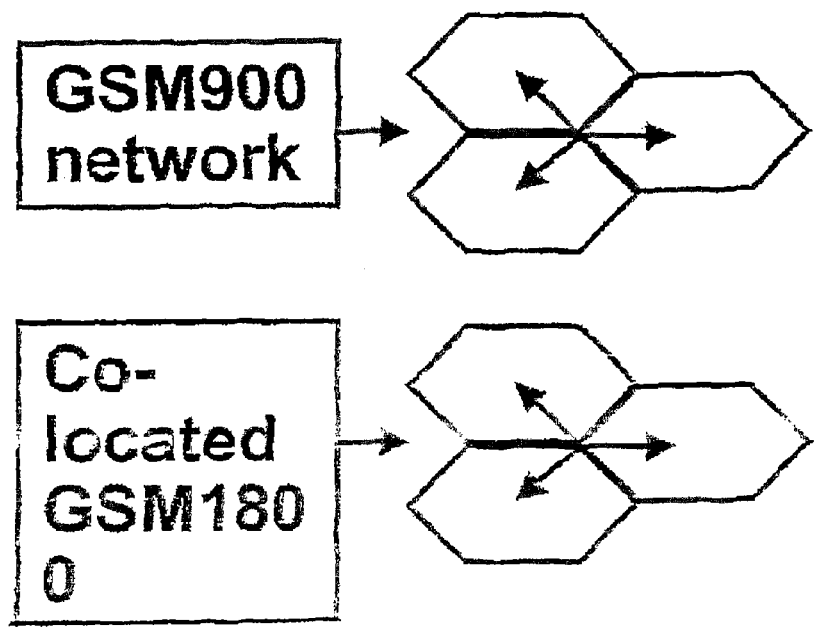
FIG. 1 shows an example for a multi-layer radio network in which a traffic database can be generated by means of the inventive method.

There are various types of multi-layer radio networks that can be used for generating a traffic database according to the inventive method. These may be, for example, as shown in FIG. 1, 2G multi-layer radio networks, for example GSM900 and GSM1800 radio networks.

In order to be able to use only one 2G traffic database for a GSM900 radio network with a GSM1800 radio network overlaying the same, a multi-layer radio cell model must be used. The advantage of using only one traffic database for the layered GSM radio networks is based in that, in areas where new base stations of the GSM1800 radio network will be built, these can directly take over the traffic from the GSM900 radio network. The traffic is thus dynamically divided between the layers in dependence upon the given radio network. The division of the traffic between the layers is addressed at each area element by means of the assignment probabilities of the multi-layer radio cell model. This can be done in such a way that the multi-layer radio cell model advantageously takes into account in the determination of the assignment probabilities a division of the traffic between the network levels as desired in the multi-layer radio network, which is based, for example, on the capacity of the network levels. The radio network shown in FIG. 1 is a GSM macrocell multi-layer radio network. A GSM900 radio network (GSM900network) is overlaid in this case by a coexisting GSM1800 radio network (co-located GSM1800).

Figure 2:
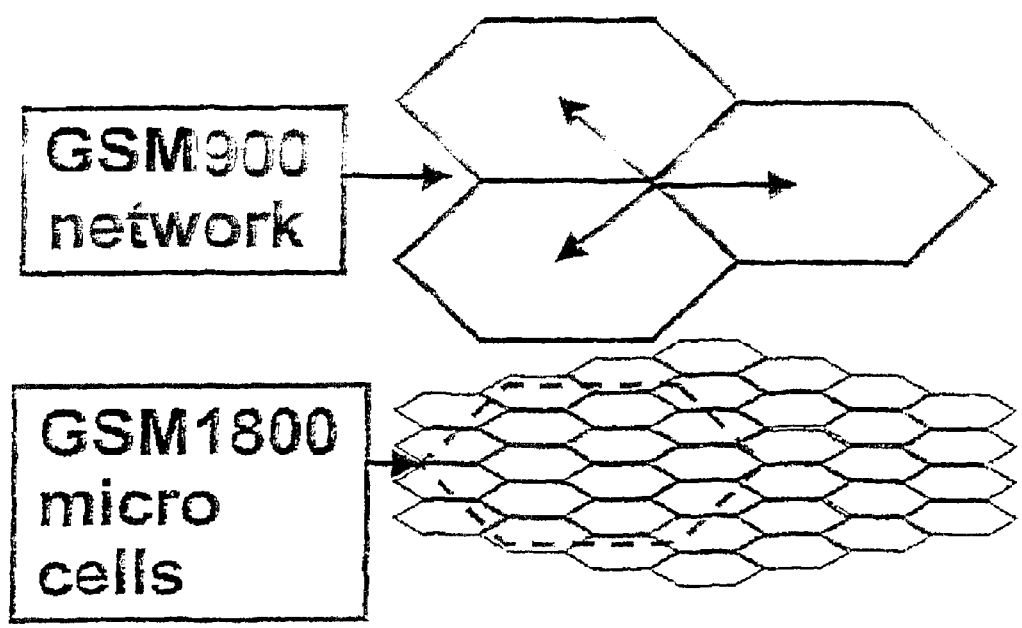
FIG. 2 shows an additional example for a multi-layer network that can be used according to the invention.

FIG. 2 shows a GSM macro-microcell multi-layer network. A GSM900 radio network (GSM900network) is again overlaid by a GSM1800 radio network (co-located GSM1800) like in FIG. 1. Whereas in FIG. 1, the GSM900 radio network and the GSM1800 radio network have radio cells of the same size, a radio cell of the GSM900 radio network is overlaid in this case by a plurality of smaller radio cells of the GSM1800 radio network. It is therefore called a macro-microcell multi-layer radio network.

Figure 3:
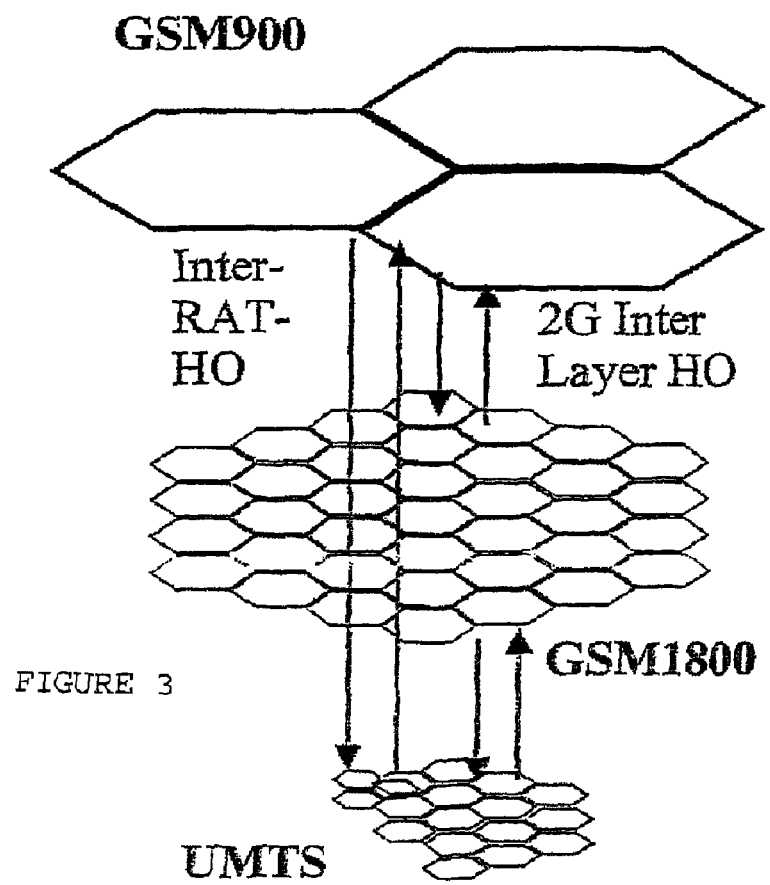
FIG. 3 shows another example for a multi-layer network that can be used according to the invention.

FIG. 3 shows another multi-layer radio network that can be used according to the inventions which is formed in this case by layering a UMTS radio network, a GSM900 radio network, and a GSM1800 radio network. A radio cell of the GSM900 radio network is overlaid by a plurality of radio cells of the GSM1800 radio network and at the same time by a plurality of radio cells of the UMTS radio network. A 2G inter-layer handover (HO) can accordingly take place between the GSM900 radio network and the GSM1800 radio network, an inter-RAT handover (RAT=Radio Access Technology) can take place between the GSM900 radio network and the UMTS radio network and also between the GSM1800 radio network and the UMTS radio network, which is illustrated by corresponding arrows.

Figure 4:
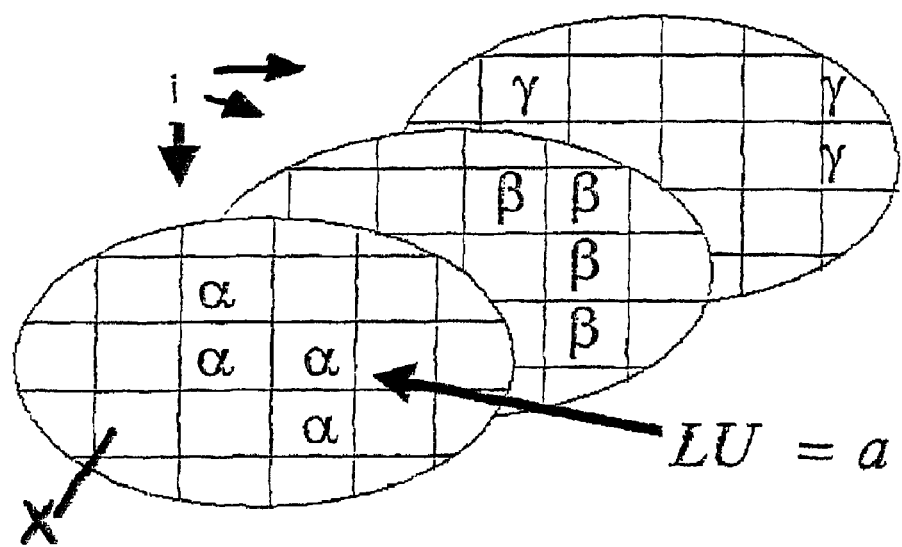
FIG. 4 shows a possible subdivision of a radio cell of a radio network into area elements.

FIG. 4 shows a radio cell i of a radio network. This radio cell i is further subdivided into a plurality of area elements x. Each of these area elements x can be assigned uniquely defined to a land usage class LU of a group of land usage classes a, b, c, etc. Additionally, each land usage class LU can be assigned land usage information in each radio cell i of the radio network, which, depending on the complexity of the given radio network being examined, corresponds either to a sum over all of the area elements assigned to the corresponding usage class of the given radio cell, like it is the case in the best-server model, or multiple expressions are obtained due to the inflow of the interaction with other radio cells that needs to be taken into account. All of this land usage information is stored according to the invention in a linear matrix C. With this matrix C and the traffic $m_i$ measured in the respective radio cells it is ultimately possible to determine land usage class coefficients $\alpha, \beta, \gamma$, etc. for certain land usage classes, and store them in a traffic database to be generated. Each radio cell i can additionally be assigned to a group g(i) of $n_g$ groups of radio cells, in which case multiple different group-specific land usage class coefficients $\alpha_{g(i)}, \beta_{g(i)}, \gamma_{g(i)}$, etc. can result for each land usage class, which are then entered into the traffic database. With the matrix C and the stored land usage class coefficients $\alpha_{g(i)}, \beta_{g(i)}, \gamma_{g(j)}$, etc., it is then possible to predict a traffic t(i) for the radio cell i.

Figure 5:
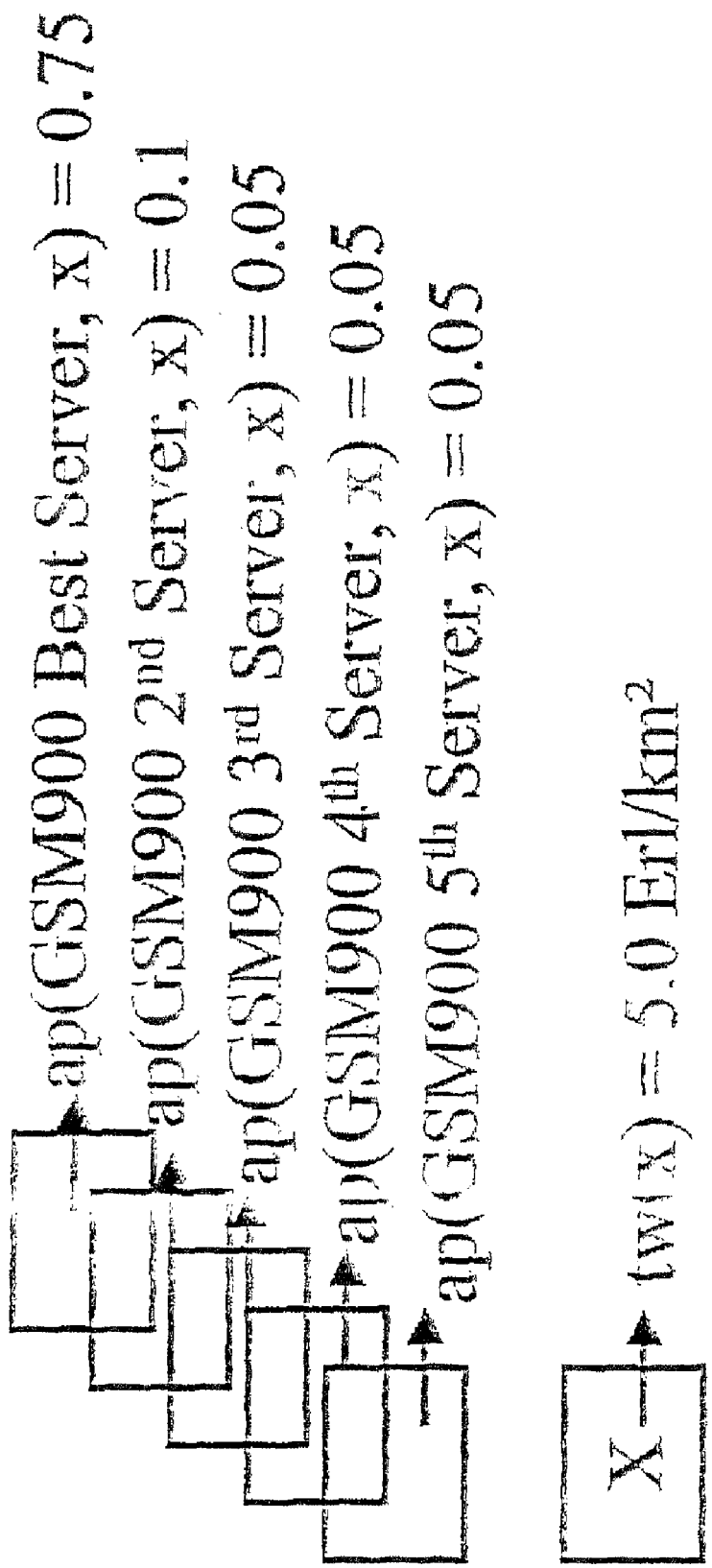
FIG. 5 shows an example for assignment probabilities of a 2G monolayer radio network.

FIG. 5 shows an example for assignment probabilities of a 2G mono-layer radio network. In a coverage area, an area element x will be examined. At this area element x, a local traffic tw(x) (tw=traffic weight) was determined to be 5.0 Erl/km². The 2G mono-layer radio network is composed of a multiplicity of radio cells and one base station is located within each radio cell. Each base station, or each radio cell can now be ascribed with a specific assignment probability with respect to the coverage of this area element x by this exact base station. A user who is located within the area element x will therefore be served by the corresponding base station with a probability corresponding to this respective assignment probability. In the process, one base station, namely the best server, receives the largest assignment probability. The best server, in this example, receives a traffic share of 0.75·5 Erl/km², the second best server receives a traffic share of 0.1·5 Erl/km² etc. The sum over all assignment probabilities equals one, which means that the area element x or the user located therein, will definitely be served or covered by a radio cell or corresponding base station.

Figure 6:
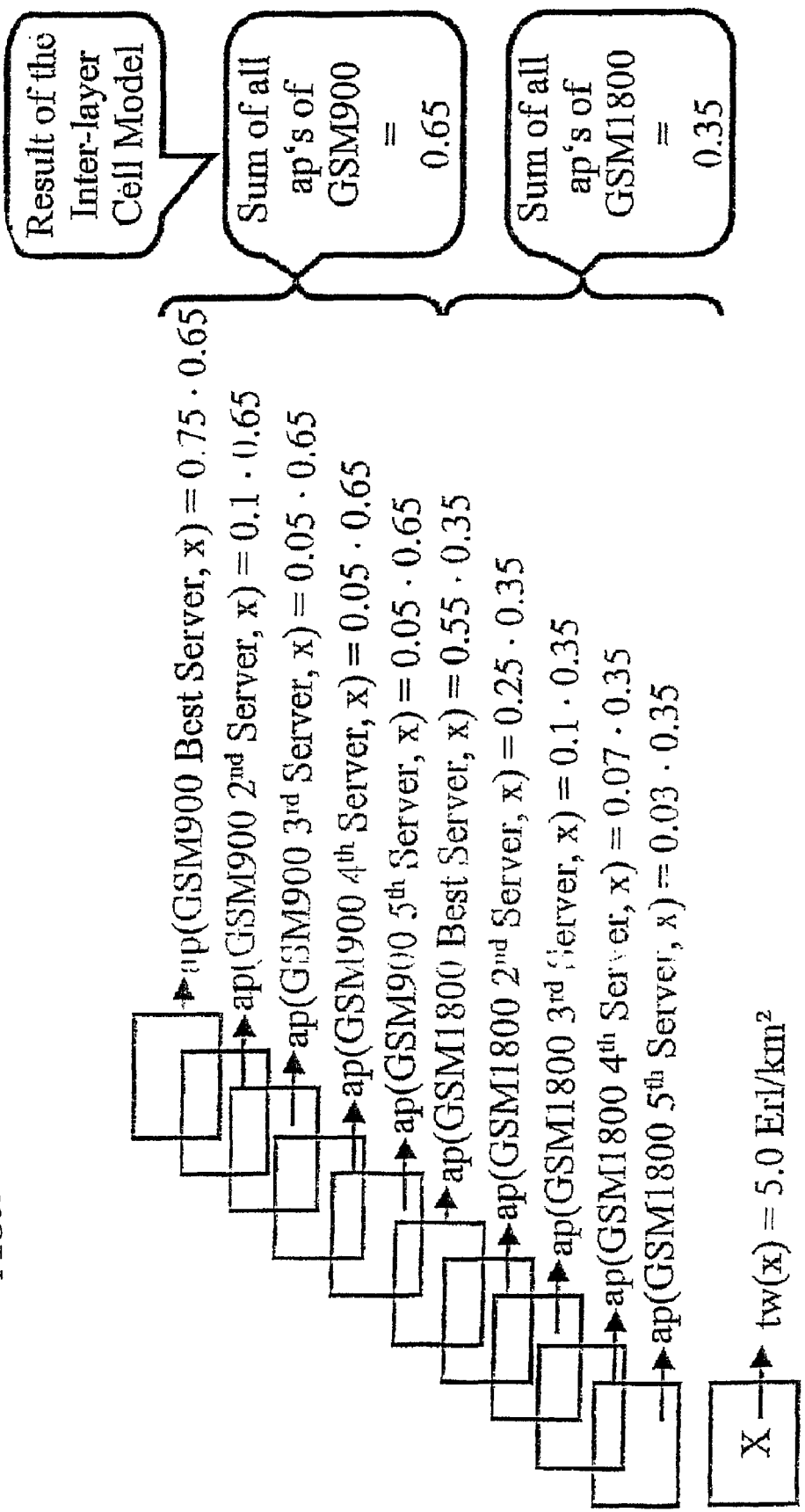
FIG. 6 shows an example for assignment probabilities of a 2G multi-layer radio network.

FIG. 6 shows an example of how the assignment probabilities that are shown in FIG. 5 can change as a result of the overlaying of a second 2G radio network. In this case it is an overlay of a GM900 radio network with a GSM1800 radio network. In the presented example, the GSM900 radio network receives a traffic share of 0.65·5 Erl/km² at the examined area element x, which is then divided again between multiple GSM900 servers. The overlaid GSM1800 radio network, in the present example, receives a traffic share of 0.35·5 Erl/km², which is also divided between multiple GSM1800 servers. A handover algorithm between the various layers also needs to be taken into account in this case. In the presented example the sum of the assignment probabilities is also one, but the assignment probabilities are now distributed over two layers. A common traffic database is generated and then used for both layers. The assignment probabilities provide for a dynamic division of traffic between the layers.

What is claimed is:

1. A method for generating a space-related traffic database for a radio network comprising a plurality of radio cells, comprising:
    assigning each of said plurality of radio cells to a group of radio cells, subdividing a region to be planned into area elements by a grid,
    allocating to each area element a respective assignment probability with respect to each of radio cells serving that area element and also a land usage class from amongst a finite group of land usage classes,
    generating the traffic database by performing a minimization process, the minimization process comprising:
    minimizing the distance between the measured traffic of a given radio cell and the traffic to be predicted of the given radio cell for each radio cell, where the traffic that is to be predicted of a respective radio cell being set equal to a sum of area elements that are weighted with land- usage-class-specific and group-specific coefficients,
    wherein the area elements assigned to the respective radio cell for a respective land usage class and for a respective group of radio cells result from the assignment probabilities of the area elements to the respective group of radio cells,
    redetermining the coefficients by the minimization process, and
    assigning the coefficients to the corresponding radio cell.

2. A method according to claim 1, in which the minimization process corresponds to an approximation of the solution of a linear equation system.

3. A method according to claim 1, in which the land usage classes are defined by geographically separable regions, especially by different classes of urban development, different classes of agricultural use and forests, as well as by roads and interstates.

4. A method according to claim 1, wherein the radio network that is used is a multi-layer radio network, especially a GSM900 radio network with a GSM1800 radio network overlaying the same.

5. A method according to claim 1, wherein the traffic database is generated based on a layer of a mono-layer radio network.

6. A method according to claim 1, wherein a criterion for a determination of the assignment probabilities of the area elements to the respective radio cells is a handover that occurs between neighboring radio cells.

7. A method according to claim 1, in which, for an area element in which a handover takes place, the sum over all assignment probabilities of the area element is smaller than 1.

8. A method according to claim 1, in which the radio network is a radio network in which a radio cell is surrounded exclusively by radio cells that belong to the same group as the one radio cell, whereby the assignment probabilities for those area elements that have non-zero assignment probabilities to the one radio cell compared cells from other groups to be set to zero, and accordingly the area elements that are assigned both to the one radio cell and to radio cells from other groups also become zero.

9. A method according to claim 1, A computer program embodied on a non- transitory computer-readable media, having a program code, with the aid of which all steps of a method according to claim 1 can be carried out when the computer program is executed on a computer or on a corresponding computing unit.

10. A method according to claim 1, a computer program product having a program code, which is stored on a non-transitory computer-readable data carrier, with the aid of which all steps of a method according to claim 1 can be performed when the computer program is executed on a computer or on a corresponding computing unit.

11. A method according to claim 2, in which the land usage classes are defined by geographically separable regions, especially by different classes of urban development, different classes of agricultural use and forests, as well as by roads and interstates.

12. A method according to claim 2, wherein the radio network that is used is a multi-layer radio network, especially a GSM900 radio network with a GSM1800 radio network overlaying the same.

13. A method according to claim 2, wherein the traffic database is generated based on a layer of a mono-layer radio network.

14. A method according to claim 2, wherein a criterion for a determination of the assignment probabilities of the area elements to the respective radio cells is a handover that occurs between neighboring radio cells.

15. A method according to claim 2, in which, for an area element in which a handover takes place, the sum over all assignment probabilities of the area element is smaller than 1.

16. A method according to claim 2, in which the radio network is a radio network in which a radio cell is surrounded exclusively by radio cells that belong to the same group as the one radio cell, whereby the assignment probabilities for those area elements that have non-zero assignment probabilities to the one radio cell compared to cells from other groups to be set to zero, and accordingly the area elements that are assigned both to the one radio cell and to radio cells from other groups also become zero.

17. A computer program having a program code, embodied on a non-transitory computer readable storage medium, with the aid of which all steps of a method according to claim 2 can be carried out when the computer program is executed on a computer or on a corresponding computing unit.

18. A computer program product having a program code, which is stored on a computer-readable non-transitory data carrier, with the aid of which all steps of a method according to claim 2 can be performed when the computer program is executed on a computer or on a corresponding computing unit.

\* \* \* \* \*